UNITED STATES PATENT OFFICE.

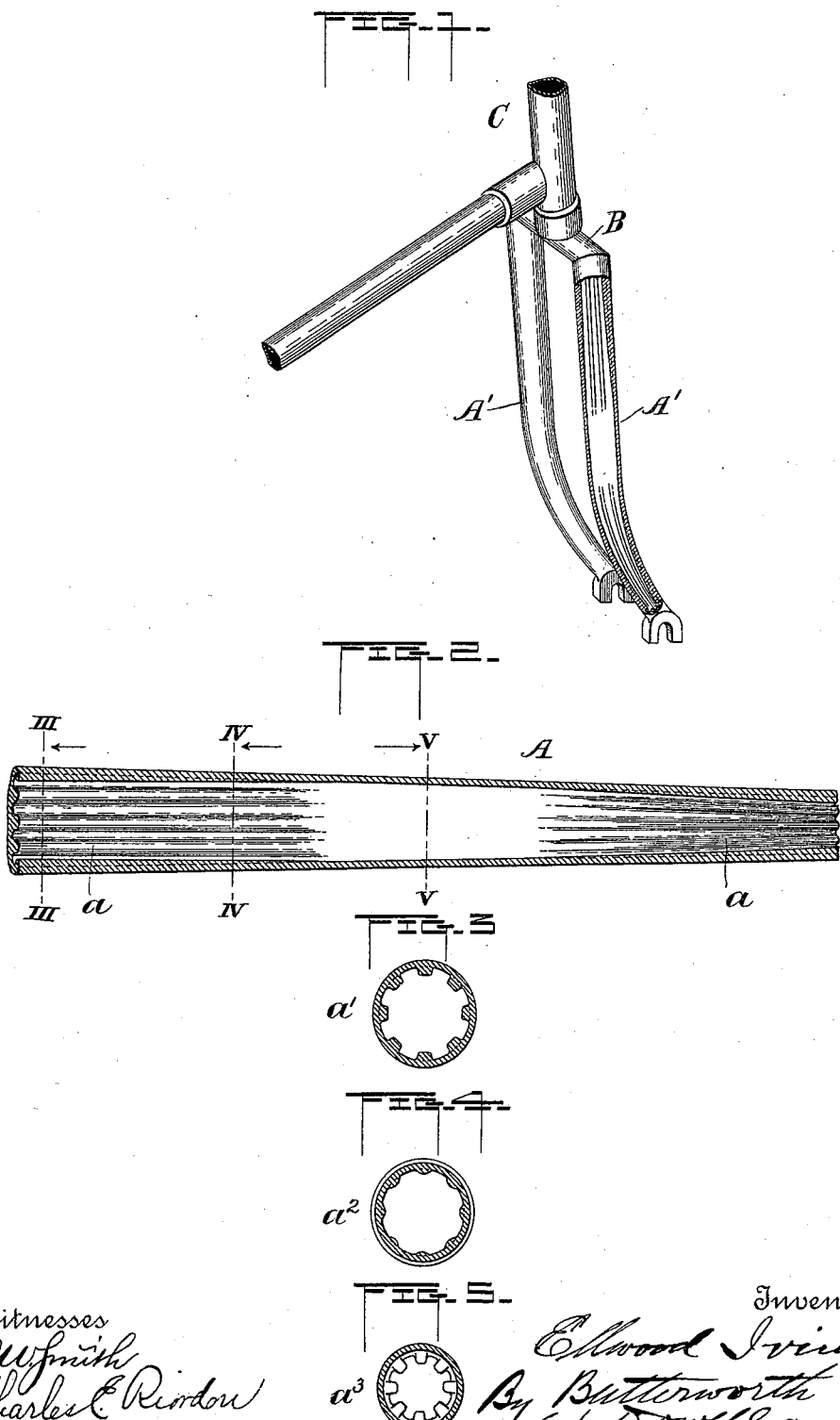

ELLWOOD IVINS, OF PHILADELPHIA, PENNSYLVANIA.

FORK SIDE FOR BICYCLES.

SPECIFICATION forming part of Letters Patent No. 602,013, dated April 5, 1898.

Application filed September 12, 1895. Renewed March 14, 1898. Serial No. 673,868. (No model.)

*To all whom it may concern:*

Be it known that I, ELLWOOD IVINS, a citizen of the United States, residing at Philadelphia, in the county of Philadelphia and State of Pennsylvania, have invented certain new and useful Improvements in Fork Sides for Bicycles; and I do hereby declare the following to be a full, clear, and exact description of the invention, such as will enable others skilled in the art to which it appertains to make and use the same.

This invention relates to the framing of bicycles and other light road-vehicles, but more particularly to fork sides for bicycles.

It has been the aim of the manufacturers and the desire of riders of modern bicycles to secure a bicycle-frame having the required strength and durability with as little weight as possible, and to this end various methods of reinforcing the fork side and other parts of the frame have been adopted, the more common method being to insert a separate piece or tube-section in the ordinary tubular fork side at such points as require strengthening on account of the strain exerted thereon and to secure the same by brazing or soldering; but such reinforcement leaves an abrupt shoulder at the junction of the inserted tube-section, which tends to weaken the outer tube at that point, and as a result the fork side is liable to bend and break at the terminus of the inserted reinforcing-tube.

The main objects of my invention are to overcome the objections incident to the aforesaid method of reinforcing fork sides and the like and to provide a fork side for bicycles or a frame-piece for light vehicles which shall have the required strength in every part thereof according to the strain to which it may be subjected in use, so as to be strongest where the strain is greatest and weakest where the strain is least, while at any intermediate point the strength shall be in proportion to the strain upon it, thus combining a maximum of strength with a minimum of material and weight.

The invention will first be described with reference to the accompanying drawings, forming a part of this specification, and then pointed out in the claims at the end of the description.

Referring to the drawings, wherein I have illustrated the invention applied to the fork of an ordinary bicycle, Figure 1 represents a perspective view of a portion of the head-piece of a bicycle with a fork embodying my invention, one of the fork sides being shown in section. Fig. 2 is a longitudinal sectional view of a tube for a fork side embodying the invention. Figs. 3, 4, and 5 are cross-sections on the lines III III, IV IV, and V V, respectively, looking in the direction of the arrows in Fig. 2.

The strain upon the fork of a bicycle when in use is greatest at or near its upper end and least at an intermediate point nearer its lower than its upper end, usually just above the knee or bend near the foot of the fork, and hence a tube of uniform diameter or tapering with the same thickness of metal at every point is heavier than necessary at the point where the least strain is exerted and too weak where increased strength is required, so that to provide additional strength when the strain is great some sort of reinforcement is necessary.

By my improvement the metal in the tube is so distributed as to give strength at every point in proportion to the strain exerted at such point, whereby I dispense with unnecessary weight of metal at points where it is not needed and avoid the necessity for reinforcing according to common methods at other points where more strength is required.

The tubes A for the fork sides may be of any desired form, but are preferably made tapering, as shown, and seamless, and they are formed on their inner surfaces with integral longitudinal ribs $a$ $a$ and intervening thin walls, said ribs extending from the ends of the tube inward in a gradual taper, so that as the distance from the end of the tube increases the ribs correspondingly decrease in size and finally vanish or merge into each other or into a smooth or ribless interior. Near the ends of the tube the ribs may be quite large, as shown by the section $a'$, Fig. 3, and gradually diminish in size, as indicated by the section $a^2$, Fig. 4, until they meet or entirely disappear, as shown by the section $a^3$, Fig. 5, thus giving body and strength to the tube at its ends with slightly-decreased strength and weight at each remove from the thicker and stronger end portions toward the center or point of least strength.

I thus provide a fork side or frame-piece which is very light as compared with the weight of an ordinary tube of the same diameter, and yet has greater strength at points where strength is most needed than a common tube containing the same quantity of metal and less strength at other points where less strength is required, so as to distribute the weight of metal and strength of the tube to correspond with the strain exerted at different points along its length.

The tapering or conical form of the tube shown provides for less strength and weight of metal at each remove from the upper end or head of the fork downward, so that in such a tube the walls of the tube and the thickness of the ribs may be about the same at each end and may correspondingly taper inward; but in a tube of uniform diameter the ribs and thickness of metal at the upper end or head of the fork should be heavier and thicker than at the lower end thereof.

In forming the fork two of the tubes, as at A' A', Fig. 1, may have their larger ends secured to the head or socket-piece B, which is attached to or formed with the head C of the bicycle-frame, while their lower reduced ends are secured in any proper manner to the axle of the front wheel.

The tubes may be formed by providing a suitable mandrel and spinning the tube thereon in a manner well known to those skilled in the art of metal-working. A tube of uniform exterior diameter will have an interior diameter in that part thereof between the ends of the ribs greater than at or near its ends, so that in making such tubes an expansible mandrel or collapsible core will be required.

A tube formed as described has the advantage of being seamless and weldless throughout and the reinforcement or ribbed portions being a part of the tube itself and having a gradual taper it is obvious that the tube will be lighter and at the same time very much stronger than a tube having a tube-section inserted therein to strengthen its weaker parts.

In my pending application, Serial No. 554,724, filed July 2, 1895, is disclosed the broad idea of making a fork side thickened at each end but without ribs, and hence make no claim herein to such construction.

Having thus fully described my invention, what I claim as new, and desire to secure by Letters Patent of the United States, is—

1. As a new article of manufacture, a tubular frame-piece for bicycles and other vehicles, consisting of a drawn tube having a series of tapering ribs on its inner surface extending longitudinally thereof; said ribs being thickest at or near the end or ends of the tube and gradually decreasing in size toward its center, substantially as described.

2. A fork side for bicycles, consisting of a seamless tube having a series of longitudinal ribs tapering inwardly from each end thereof toward its center and gradually vanishing or merging into an intermediate portion of smooth bore, substantially as described.

3. A fork side for bicycles, consisting of a seamless tubular piece of tapering form having a series of longitudinal ribs extending from each end on the inside thereof toward its center and gradually diminishing in size until they vanish or merge in an intermediate portion having a smooth bore, substantially as described.

In testimony whereof I affix my signature in presence of two witnesses.

ELLWOOD IVINS.

Witnesses:
J. N. SCHAUB,
WM. H. FAULKNER.